United States Patent
Zeng (10) Patent No.: US 12,452,972 B2
(45) Date of Patent: Oct. 21, 2025

(54) COLOR CORRECTION DEVICE, AND COLOR CORRECTION SYSTEM HAVING EXTERNAL FLASH

(71) Applicant: YINGYOU EQUIPMENT CO., LTD., Guangdong (CN)

(72) Inventor: Weiling Zeng, Guangdong (CN)

(73) Assignee: YINGYOU EQUIPMENT CO., LTD., Guangdong (CN)

( * ) Notice: Subject to any disclaimer, the term of this patent is extended or adjusted under 35 U.S.C. 154(b) by 336 days.

(21) Appl. No.: 18/296,812

(22) Filed: Apr. 6, 2023

(65) Prior Publication Data

US 2023/0262857 A1    Aug. 17, 2023

Related U.S. Application Data

(63) Continuation of application No. PCT/CN2021/101592, filed on Jun. 22, 2021.

(30) Foreign Application Priority Data

Jan. 22, 2021 (CN) .......................... 202110093820.X
Jan. 22, 2021 (CN) .......................... 202120202992.1

(51) Int. Cl.
*H05B 45/22* (2020.01)
*G03B 15/05* (2021.01)
(Continued)

(52) U.S. Cl.
CPC ............. *H05B 45/22* (2020.01); *G03B 15/05* (2013.01); *G03B 2215/0514* (2013.01); *G03B 2215/0567* (2013.01)

(58) Field of Classification Search
CPC ........ H05B 45/22; H05B 47/19; G03B 15/05; G03B 2215/0514; G03B 2215/0567
See application file for complete search history.

(56) References Cited

U.S. PATENT DOCUMENTS

9,071,744 B1   6/2015 Rahman et al.
9,110,355 B1 * 8/2015 Nourbakhsh .......... G03B 15/05
(Continued)

FOREIGN PATENT DOCUMENTS

CN    1446444    10/2003
CN    1912770     2/2007
(Continued)

OTHER PUBLICATIONS

Title: Controller for camera flash units has memory for storing settings of each flash unit and program memory for storing flash ignition program, Author: Srzentic Robert, p. 1-41 (Original) (Year: 2004).*

(Continued)

*Primary Examiner* — Wei (Victor) Y Chan
(74) *Attorney, Agent, or Firm* — Hodgson Russ LLP (57) ABSTRACT

A color correction device comprises a light-emission information collection circuit, a first communication circuit and a color correction processing circuit, wherein the light-emission information collection circuit is used for collecting light-emission information of an external flash; the first communication circuit is used for communicating with a terminal device, so as to receive a color correction control instruction sent by the terminal device; the color correction processing circuit receives the color correction control instruction transmitted by the first communication circuit and then performs color correction processing on the basis of the light-emission information to generate color correction result information; and the color correction result information is used for being transmitted to the external flash so as to correct light-emission of the external flash. The color correction device can be used for color correction of the external flash.

19 Claims, 4 Drawing Sheets

(51) Int. Cl.
    *H05B 45/20*     (2020.01)
    *H05B 47/11*     (2020.01)
    *H05B 47/19*     (2020.01)

(56) References Cited

U.S. PATENT DOCUMENTS

| | | | | |
|---|---|---|---|---|
| 9,326,348 | B2* | 4/2016 | Roshan | H05B 45/22 |
| 10,602,585 | B2 | 3/2020 | Wu et al. | |
| 2005/0265014 | A1 | 12/2005 | Matsui et al. | |
| 2005/0281549 | A1* | 12/2005 | Shih | G03B 7/08 |
| | | | | 396/57 |
| 2009/0190119 | A1 | 7/2009 | Lewin et al. | |
| 2010/0014274 | A1 | 1/2010 | Shyu et al. | |
| 2012/0069240 | A1* | 3/2012 | Osawa | G03B 19/12 |
| | | | | 348/E5.029 |
| 2013/0207566 | A1 | 8/2013 | Sawada et al. | |
| 2013/0342817 | A1* | 12/2013 | Katahira | H04N 5/58 |
| | | | | 353/121 |
| 2015/0334258 | A1 | 11/2015 | O'Neill | |
| 2016/0381761 | A1* | 12/2016 | Tseng | H05B 45/60 |
| | | | | 315/158 |
| 2017/0202075 | A1* | 7/2017 | Zhou | H04N 23/10 |

FOREIGN PATENT DOCUMENTS

| | | |
|---|---|---|
| CN | 202998580 | 6/2013 |
| CN | 103369767 | 10/2013 |
| CN | 104601893 | 5/2015 |
| CN | 105096816 | 11/2015 |
| CN | 106911899 | 6/2017 |
| CN | 207198524 | 4/2018 |
| CN | 112037709 | 12/2020 |
| CN | 112764292 | 5/2021 |
| CN | 214704266 | 11/2021 |
| DE | 19842367 | 7/2004 |
| EP | 2391118 | 11/2011 |
| JP | 2000047279 | 2/2000 |
| JP | 2005115059 | 4/2005 |
| JP | 2018107741 | 7/2018 |

OTHER PUBLICATIONS

Title: Controller for camera flash units has memory for storing settings of each flash unit and program memory for storing flash ignition program, Author: Srzentic Robert, p. 1-41 (Translation) (Year: 2004).*

EPO, Extended European Search Report for EP Application No. 21920525.9, Jul. 1, 2024.

CNIPA, First Office Action for CN Application No. 202110093820.X, Dec. 27, 2024.

WIPO, International Search Report for PCT/CN2021/101592, Oct. 13, 2021.

CNIPA, Second Office Action for CN Application No. 202110093820.X, May 31, 2025.

CNIPA, Third Office Action for CN Application No. 202110093820.X, Sep. 4, 2025.

* cited by examiner

COLOR CORRECTION DEVICE, AND COLOR CORRECTION SYSTEM HAVING EXTERNAL FLASH

CROSS-REFERENCE TO RELATED APPLICATIONS

This application is a continuation of International Application No. PCT/CN2021/101592, filed Jun. 22, 2021, which claims priority to Chinese Patent Application Nos. 202110093820.x and 202120202992.1, each filed Jan. 22, 2021, the entire disclosures of which are incorporated herein by reference.

FIELD OF TECHNOLOGY

The present application relates to the technical field of photographing-specific flash, and more particularly, to a color correction device and a color correction system having an external flash.

BACKGROUND

With the development of mobile communication technology, mobile terminals have played an increasingly important role in people's life and work. Especially some mobile terminal devices with photographing functions, such as mobile phone, MP4, PDA, and notebook computer. The camera functions inherent in these mobile terminal devices can bring great fun to people's lives. Photographing requires light sources, and artificial light is often needed to assist in photographing besides natural light. An artificial light source of the mobile terminal with photographing functions often cannot meet the actual use requirements. Therefore, people often use an external flash to assist in photographing.

However, after long-term use of LED lamp beads in the external flash, there will be deviations in chroma and light-emission intensity, resulting in the fact that actual light-emission illuminance, chroma, and other light-emission parameters cannot reach preset light-emission parameters so that the expected light filling effect cannot be realized.

The above information disclosed in the Background is only for enhancement of understanding of the background of the present disclosure and therefore it may include information that does not constitute prior art known to a person of ordinary skill in the art.

SUMMARY

There are provided a color correction device and a color correction system having an external flash according to embodiments of the present disclosure. The technical solution is as below:

According to one aspect of the present application, a color correction device is provided in the present application, including:
  a light-emission information collection circuit configured to collect light-emission information of an external flash;
  a first communication circuit configured to communicate with a terminal device, so as to receive a color correction control instruction sent by the terminal device; and
  a color correction processing circuit electrically connected to the light-emission information collection circuit and the first communication circuit, where the color correction processing circuit receives the color correction control instruction transmitted by the first communication circuit and then performs color correction processing on the basis of the light-emission information to generate color correction result information, and the color correction result information is configured to be transmitted to the external flash so as to correct light-emission of the external flash.

According to another aspect of the present application, the present application further proposes a color correction system having an external flash, including an external flash, a color correction device, and a terminal device; where the color correction device is configured to detect light-emission information of the external flash and processing the light-emission information under the control of the terminal device to generate color correction result information; and the external flash corrects light-emission according to the color correction result information.

It should be understood that the above general description and the following detailed description are exemplary and explanatory only and are not intended to limit the present application.

BRIEF DESCRIPTION OF THE DRAWINGS

The above and other objects, features, and advantages of the present application will become more apparent by describing in detail exemplary embodiments thereof with reference to the accompanying drawings.

DETAILED DESCRIPTION OF THE EMBODIMENTS

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front, and back) are used to explain that the structure and movement of the various elements of the present application are not absolute but relative. These descriptions are appropriate when these elements are in the positions shown in the drawings. If the description of the positions of the element changes, the indications of the directions change accordingly.

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art. The accompanying drawings are only schematic illustrations of the present application and are not necessarily drawn to scale. Like reference numerals in the figures denote identical or similar parts and thus repetitive descriptions thereof will be omitted.

The preferred embodiment of the present application is further elaborated below in conjunction with the accompanying drawings of the description.

In the present application, a color correction device is first proposed, where the color correction device is used for color correction of an external flash. Color correction may refer to matching actual light-emission parameters of the external flash with set light-emission parameters, and it may also refer to adjusting the consistency of light-emission parameters of each LED lamp bead in the external flash. Light-emission parameters may include luminance, color temperature, and saturation, etc.

Figure 1:
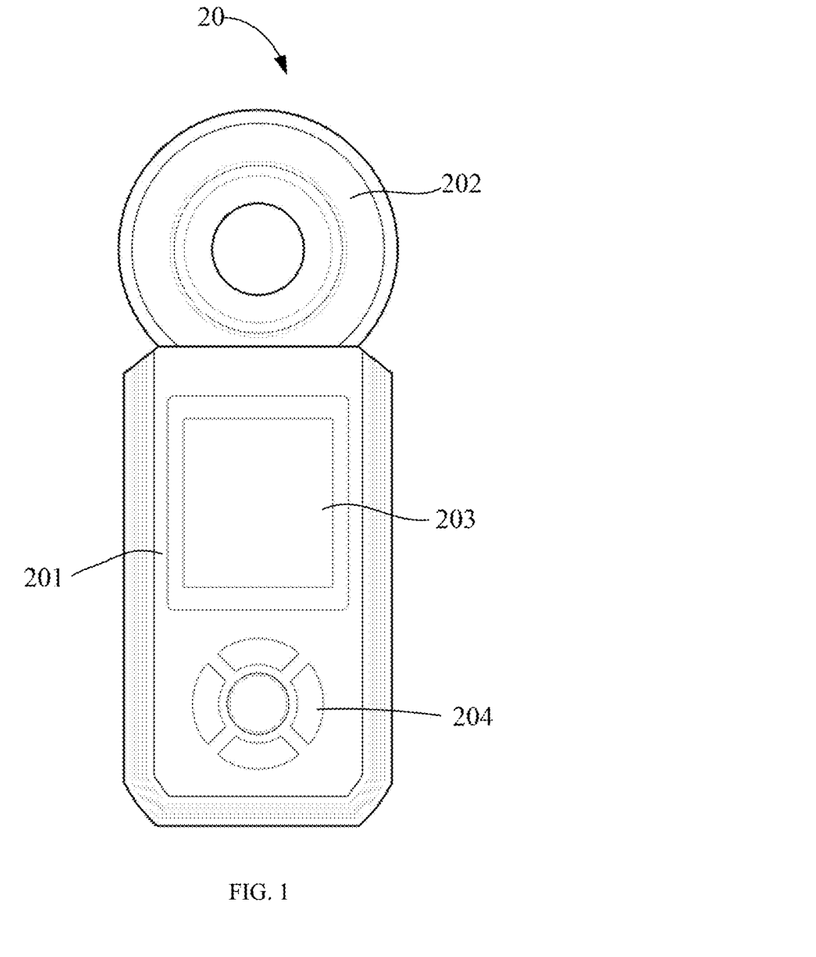
FIG. 1 is a structural view of a color correction device according to an example embodiment.
Figure 2:
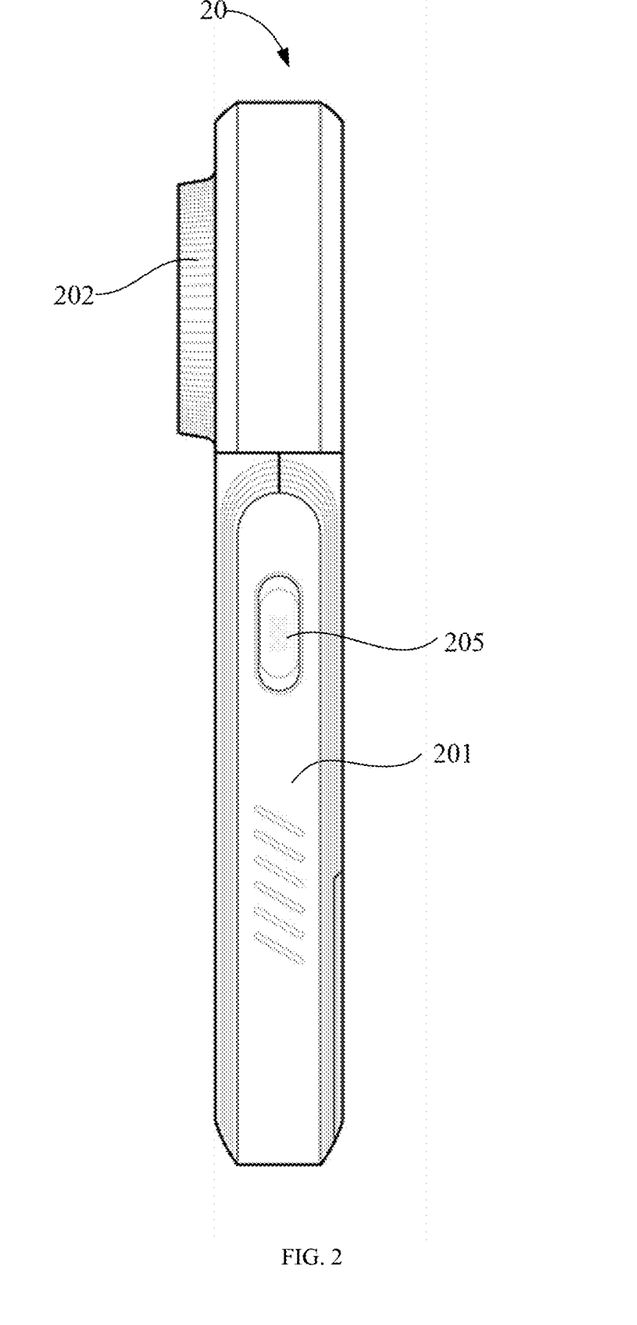
FIG. 2 is a side view of FIG. 1.

Referring to FIG. 1 and FIG. 2, in an embodiment, a color correction device includes a main body 201 and a light pick-up portion 202 protruding from one side of the main body 201. Specifically, the main body 201 is roughly square, and an accommodating chamber is provided inside the main body 201 to accommodate one or more circuit boards. It should be understood that relevant circuits of the present application may be partially or completely laid on the circuit board. A side surface of the main body 201 is further provided with a toggle key 205, and when the toggle key 205 is on, the color correction device 20 is turned on, and when the toggle key 205 is off, the color correction device 20 is turned off. The light pick-up portion 202 is located on the upper side of the main body 201. Since the light radiation range of the external flash 10 is roughly circular, the light pick-up portion 202 is also provided to be a roughly circular shape in the present application, so as to uniformly pick up a light beam emitted by the external flash 10. The color correction device 20 in the present application may be a handheld device, so as to facilitate a user to carry outdoors to perform color correction on the external flash at any time.

The main body 201 and the light pick-up portion 202 may be detachably connected. Specifically, the connection may be a snap-fit connection or a connection that is formed by cooperation between a slide chute and a sliding block, where the slide chute is provided on the main body 201, and the sliding block is provided on the light pick-up portion 202.

Figure 3:
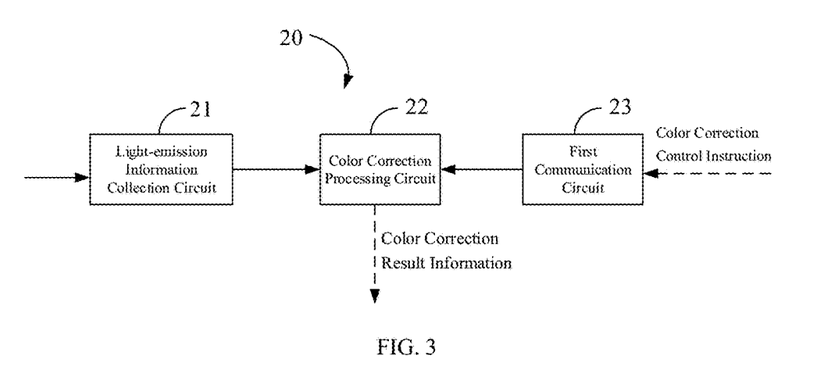
FIG. 3 is a circuit structure block diagram of a color correction device according to an example embodiment.

FIG. 3 is a circuit structure block diagram of a color correction device according to an example embodiment. In an embodiment, the color correction device includes a light-emission information collection circuit 21, a first communication circuit 23, and a color correction processing circuit 22. The light-emission information collection circuit 21 is used for detecting light-emission information of an external flash 10. The first communication circuit 23 is used for communicating with a terminal device 30, so as to receive a color correction control instruction sent by the terminal device 30. The color correction processing circuit 22 is electrically connected to the light-emission information collection circuit 21 and the first communication circuit 23, the color correction processing circuit 22 receives the color correction control instruction transmitted by the first communication circuit 23 and then performs color correction processing on the basis of the light-emission information to generate color correction result information; and the color correction result information is used for being transmitted to the external flash 10, so as to correct light-emission of the external flash 10.

The color correction device 20 may further include a housing, and the light-emission information collection circuit 21, the color correction processing circuit 22, and the first communication circuit 23 are all integrated into the housing. The color correction device 20 in the present application may be a handheld device, so as to facilitate a user to carry outdoors to perform color correction on the external flash 10 at any time.

Herein, the light-emission information includes one or more information of luminance, chroma, saturation, and the like. Here, the external flash 10 may be taken as a whole to collect its parameters such as luminance, chroma, and saturation. In another embodiment, in the case that a flashlight includes multiple LED light sources, the light-emission information is one or more parameters among luminance, chroma, saturation, and the like of each LED light source. That is, in this embodiment, each LED light source is used as a minimum circuit to perform light-emission correction on each LED in a targeted manner, so as to improve the accuracy of light-emission correction. During the detection, each LED light source may be enabled to emit light independently, thus the light-emission information of the LED light source is obtained.

The light-emission information collection circuit 21 may include a color pick-up circuit, a data conversion circuit, a filter circuit, etc. According to a target to be corrected, the color pick-up circuit may include various types of light sensors, such as an illuminance sensor, a chroma sensor, and a color temperature sensor. A collection window is usually provided on the housing. The collection window is provided facing a light-emission surface of the external flash 10, thus the color pick-up circuit can receive the light emitted by the external flash 10. Here, the light emitted by the external flash 10 may be picked up multiple times. Schematically, the external flash 10 is enabled to operate in various light-emission modes and light-emission information in every mode is sampled. Here, the light-emission modes include flashing mode, modeling light mode, constant lighting mode, etc. In each mode, the light-emission information is picked up at least once. The data conversion circuit is used for converting an analog quantity of the sampled light-emission information into a corresponding digital quantity. The filter circuit is used for filtering an input or an output of the data conversion circuit to reduce noise interference.

The color correction processing circuit 22 may include a data arrangement circuit and a data processing circuit. The data arrangement circuit is connected to an analog-to-digital conversion circuit, so as to perform data arrangement on the digital quantity of the collected light-emission information. The specific data arrangement method can be determined according to the color correction algorithm, and can also be arranged according to the position of the LEDs in the external flash 10.

A color correction algorithm may be stored in the data processing circuit. The above arranged light-emission data will be logically calculated with the color correction processing algorithm, thus generating color correction result information. The color correction result information may be an adjustment program or a specific light-emission correction value.

Schematically, in one example, the data processing circuit includes a color correction chip, in which a correction coefficient matrix is provided. Based on the correction coefficient matrix, the above arranged sampling data is calculated and processed.

In another case, a preset parameter value is compared with the sampled light-emission information arrangement data to correct a driving current of the external flash 10. The external flash 10 driven by the corrected driving current can enable the actual light-emission parameters of the flashlight to exactly match the set parameters.

The first communication circuit 23 of the color correction device 20 is used for communicating with the terminal device 30. The first communication circuit 23 may be a wireless communication circuit. Here, the wireless communication circuit may be built into the color correction device 20 or external to the color correction device 20, for example, an external USB wireless transmitter. The first communication circuit 23 may be a wireless communication circuit. The wireless communication circuit includes one or more of a WIFI module, a Bluetooth module, a Zig-Bee module, and an infrared communication module. This embodiment improves the convenience of communication between the color correction device 20 and the terminal device 30. And the arrangement of the wireless communication circuit can eliminate the need for providing interfaces on the color correction device 20 and the terminal device 30.

In another embodiment, the first communication circuit 23 includes a communication interface, where the communication interface is one of a USB interface, a TYPE C interface, an RS232 interface, and an RS485 interface. Here, there may be one or more communication interfaces.

In the present embodiment, the terminal device 30 may be a smart terminal, such as a mobile phone, a tablet, or a notebook computer; the terminal device 30 may also be a smart wearable device, such as a smart head-mounted device, a smart bracelet, or a smart belt. The terminal device 30 is widely used in today's work and life. The solution of the present application combines the color correction device 20 with the terminal device 30, which is conducive to reducing the volume of the color correction device 20 and making it easy for the user to carry.

In an embodiment, the terminal device 30 includes a display unit, and the display unit is used for displaying a GUI (Graphical User Interface) screen for inputting a color correction control instruction. Specifically, a color correction application software is installed in the terminal device 30, and when the color correction application software is running, a color correction control interface can be displayed on a display screen. The color correction control interface includes multiple controls for the user to send a color correction start instruction, set a color correction parameter, select a color correction mode, and the like (hereinafter referred to as color correction control instructions). The color correction control interface may further include a displaying window to display color correction progress. This embodiment improves the intelligence of the color correction device 20, improves the human-computer interaction ability, and makes it convenient for the user to correct the different parameters (illuminance, chroma, saturation, etc.) of the external flash 10 according to their own needs, and correct these parameters to target parameters that meet their own requirements.

After an intelligent terminal receives the color correction control instruction sent by the user, the instruction is transmitted to the color correction processing circuit 22 through the first communication circuit 23, so that the color correction processing circuit 22 performs color correction processing on the light-emission information of the external flash 10 according to the color correction control instruction, thus generating the corresponding color correction result information.

In the solution of the present application, the first communication circuit 23 is provided and used for communicating with the terminal device 30, so as to receive the color correction control instruction sent by the terminal device 30. The color correction processing circuit 22 receives the color correction control instruction transmitted by the first communication circuit 23 and then performs color correction processing on the basis of the collected light-emission information to generate color correction result information. The color correction result information is used for being transmitted to the external flash 10 so as to correct light-emission of the external flash 10. Thus, the present embodiment realizes the light-emission correction of the external flash 10.

Figure 4:
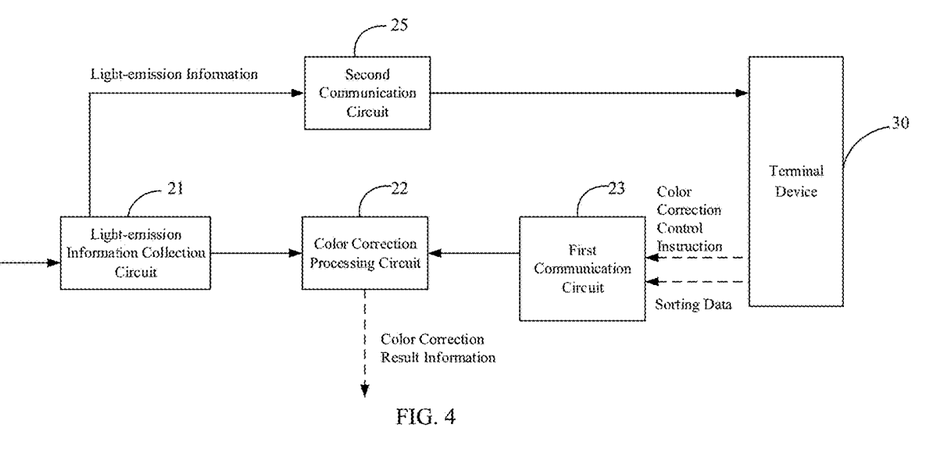
FIG. 4 is a circuit connection block diagram of a color correction device and a terminal device according to an example embodiment.

FIG. 4 is a circuit connection block diagram of a color correction device and a terminal device according to an example embodiment. In another embodiment of the present application, the color correction device 20 further includes a second communication circuit 25, and the second communication circuit 25 is used for sending the light-emission information of the external flash 10 to the terminal device 30. The terminal device 30 is used for processing the light-emission information into sorting data of light-emission information. The first communication circuit 23 is used for receiving the sorting data of the light-emission information and sending the sorting data of the light-emission information to the color correction processing circuit 22.

In this embodiment, a data sorting circuit may be provided in the terminal device 30. Since data sorting requires fast operation speed and storage capacity, the data sorting speed can be improved by using a powerful processor and large storage capacity of terminal device 30. More importantly, since there is no need to provide the sorting circuit in the color correction device 20, the volume of the color correction device 20 can be reduced, which is conducive to improving the portability of the color correction device 20.

Further, the functions of the data conversion circuit and the filter circuit mentioned above may be completed by the terminal device 30, thereby further reducing the volume of the color correction device 20. At this time, the light-emission information collection circuit 21 of the color correction device 20 directly transmits the analog quantity of the collected light-emission information to the terminal device 30, and the terminal device 30 performs data conversion, filtering, sorting, and other data processing.

Here, the second communication circuit 25 may be the same as the first communication circuit 23 or may be independent of each other. Similarly, the second communication circuit 25 may also be a wireless communication circuit or a communication interface.

Figure 5:
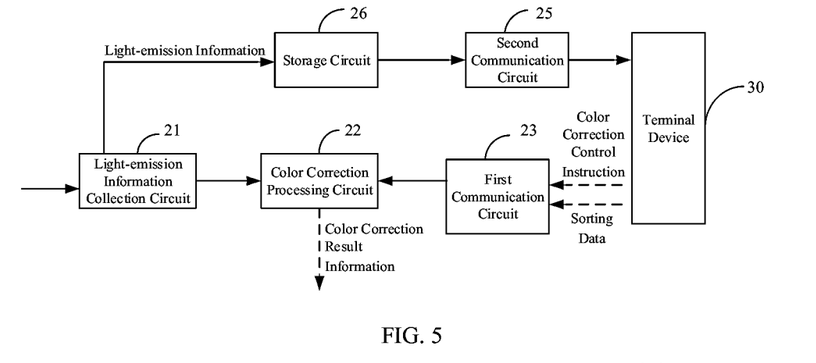
FIG. 5 is a circuit connection block diagram of a color correction device and a terminal device according to another example embodiment.

FIG. 5 is a circuit connection block diagram of a color correction device and a terminal device according to another example embodiment. In an embodiment, the color correction device 20 further includes a storage circuit 26, and the storage circuit 26 is used for storing the light-emission information of multiple detections. The storage circuit 26 is electrically connected to the second communication circuit 25 to transmit the light-emission information to the terminal device 30 through the second communication circuit 25. The storage circuit 26 may be ROM, RAM, etc., or may be a storage medium, such as a USB flash disk.

In this embodiment, the color correction device 20 may be used for collecting multiple groups of light-emission information and storing the light-emission information. Then, if conditions permit, the color correction device 20 may establish a communication connection with the terminal device 30 to realize the color correction processing of the light-emission information. The processed color correction result information may also be stored in the storage circuit 26 for being transmitted to the external flash at the appropriate time to realize the final correction process. This embodiment improves the convenience of color correction.

In an embodiment, the light-emission information collection circuit 21 further includes a time sequence reception terminal, and the time sequence reception terminal is used for connecting with the terminal device 30 to receive sequence control instruction sent by the terminal device 30; and the light-emission information collection circuit 21 collects light-emission information of the external flash 10 according to the sequence control instruction.

The time sequence reception terminal and the terminal device 30 can be connected directly or indirectly, which is not limited herein. The sequence control instruction is used for controlling the external flash 10 to emit light at a preset sequence and controlling light-emission information collection circuit 21 to collect light-emission information at a preset sequence.

Here, the sequence control instruction may include a light-emission mode execution order, a light-emission frequency, an illuminance-changing sequence, a color-changing sequence, and the like of the external flash 10. The sequence control instruction also controls the light-emission information collection circuit 21 to collect the light emitted by the external flash 10 in a preset sequence, so that a collection sequence is synchronized with the light-emission timing, so that sequence information corresponding to the collected light-emission information can be determined, and the accuracy of correction can be improved. In addition, this embodiment allows the light-emission information collection circuit 21 not to collect data when the external flash 10 does not emit light, which is conducive to reducing noise interference of the light-emission information collection circuit 21 and improving the accuracy of data arrangement; and it is also conducive to energy conservation.

In another embodiment, the color correction device 20 further includes a sequence control circuit, and the sequence control circuit is electrically connected to the terminal device 30, the external flash 10, and the light-emission information collection circuit 21; and the sequence control circuit sends a sequence signal to the external flash 10 and the light-emission information collection circuit 21 according to the color correction control instruction, so that the external flash 10 emits light at a preset sequence and the light-emission information collection circuit 21 correspondingly collects the light-emission information at a preset sequence.

In an embodiment, the color correction device 20 further includes a third communication circuit 24, and the third communication circuit 24 is configured to communicate with the external flash 10, so as to transmit the color correction result information to the external flash 10. The wireless communication circuit may be built into the color correction device 20 or external to the color correction device 20, for example, an external USB wireless transceiver. The wireless communication circuit may be a Bluetooth module, a WIFI module, a Zig-Bee module, and a broadcast module.

Of course, the third communication circuit 24 may also be a communication interface, such as one of a USB interface, a TYPE C interface, an RS232 interface, and an RS485 interface, so as to realize data and signal interaction by being connected with the external flash 10 through a connection line.

In an embodiment, the external flash 10 includes a control chip, a driving circuit, and a light source circuit. The control chip sends a control signal to the driving circuit, and then the driving circuit drives the light source circuit to emit light. In an embodiment, the color correction processing circuit 22 sends the color correction result information to the control chip or the driving circuit of the external flash 10 through the communication circuit, so as to directly correct the light-emission of the light source circuit. This embodiment may be used in a debugging process of the correction.

In another embodiment, the color correction device 20 further includes a programming circuit, and the programming circuit is electrically connected to the color correction processing circuit 22 for electrical connection with the external flash 10, so as to program the color correction result information output by the color correction processing circuit 22 onto a control chip of the external flash 10. In this embodiment, the programming circuit may be in handshake communication with the control chip to satisfy relevant communication protocols, so that the programming can proceed smoothly, thus fundamentally correcting the deviation of the light-emission effect of the external flash 10.

Here, the programming circuit and the color correction processing circuit 22 may be electrically connected directly or indirectly. The programming circuit may be built into the housing of the color correction device 20; or the programming circuit may be external to the housing of the color correction device 20 to form an independent module.

In an embodiment, the color correction device 20 further includes a human-computer interaction assembly, and the human-computer interaction assembly is provided on the main body 201. The human-computer interaction assembly is electrically connected to the light-emission information collection circuit 21 and the color correction processing circuit 22, and the human-computer interaction assembly is used for one or more of receiving a color correction instruction, receiving a color correction setting parameter, and switching color correction modes.

In an example, the human-computer interaction assembly may be a touch-control screen assembly, a key assembly, a voice input assembly, and the like for the user to input color correction relevant instructions. When the user sends a color correction instruction, the light-emission information collection circuit 21 starts to collect light-emission information, and then the color correction processing circuit 22 further starts to process data. The received color correction setting parameters include a color correction accuracy parameter, a color correction target parameter, etc. The color correction mode may include an illuminance correction mode, a chroma correction mode, a saturation correction mode, and a comprehensive correction mode (simultaneously correcting illuminance, chroma, saturation, etc.). In a specific embodiment, the human-computer interaction assembly includes a plurality of keys 204. The user presses the plurality of keys 204 to send a color correction instruction, set a color correction parameter, and switch color correction modes.

In an embodiment, the color correction device 20 further includes a display screen 203, and the display screen 203 is provided on the main body 201; and the display screen 203 is electrically connected to the color correction processing circuit 22, so as to display a color correction control interface under the control of the color correction processing circuit 22. Here, a color correction application software may be stored in the color correction device 20 (specifically, may be in the color correction processing circuit 22), and when the color correction application software is running, a color correction control interface can be displayed on a display screen 203. The color correction control interface includes multiple controls for the user to send a color correction control instruction, set a color correction parameter, select a color correction mode, etc. The color correction control interface may further include a displaying window to display color correction progress. This embodiment improves the intelligence of the color correction device 20, improves the human-computer interaction ability, and makes it convenient for the user to correct the different parameters of the external flash 10 according to their own needs, and correct these parameters to target parameters that meet their own requirements.

The "circuit" mentioned in the above-mentioned embodiments, such as the light-emission information collection circuit 21, the color correction processing circuit 22, the communication circuit, the programming circuit, the sequence control circuit, the receiving circuit, and the display circuit, can be built by adopting physical circuits or specific chips.

Moreover, the above-mentioned light-emission information and color correction result information only represent the substantial meaning of the signal. In fact, in the process of signal transmission, the form will change. For example, the conversion of analog quantity and digital quantity, transmission in the form of a single signal or packaging into data packets, etc., are not specifically limited herein.

Figure 6:
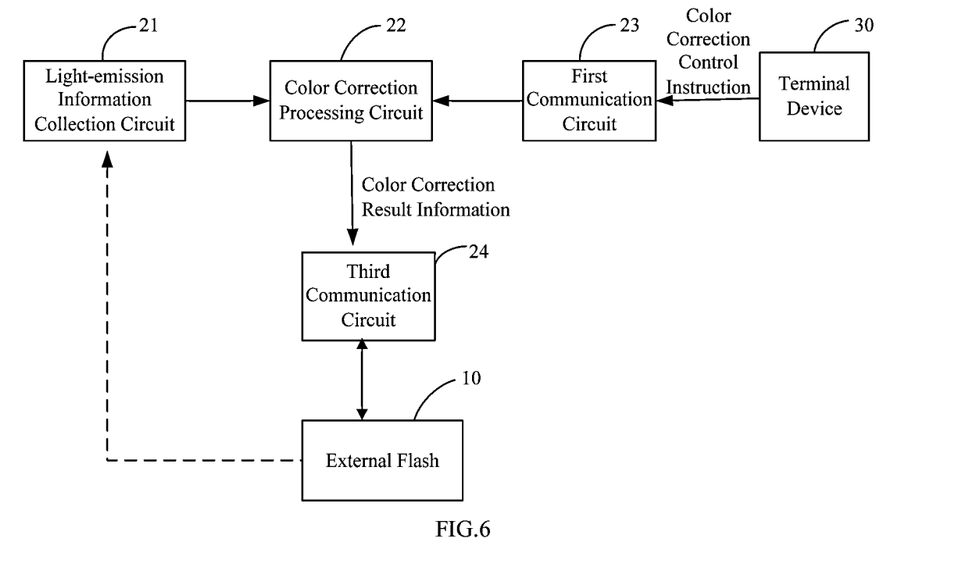
FIG. 6 is a circuit structure block diagram of a color correction system having an external flash according to an example embodiment.

FIG. 6 is a circuit structure block diagram of a color correction system having an external flash according to an example embodiment. Another aspect of the present application further proposes a color correction system having an external flash. The color correction system includes the external flash 10, and the color correction device and the terminal device 30 in the above-mentioned embodiments, where the color correction device 20 is configured to detect light-emission information of the external flash 10 and process the light-emission information under the control of the terminal device 30 to generate color correction result information; and the external flash 10 corrects light-emission according to the color correction result information.

While the present application has been described with reference to several exemplary embodiments, it should be understood that the terms used herein are illustrative and exemplary and are not limiting. Since the present application can be embodied in various forms without departing from the spirit or essence of the invention, it should therefore be understood that the foregoing embodiments are not limited to any of the foregoing details, but should be construed broadly within the spirit and scope of the appended claims, so that all variations and modifications falling within the scope of the claims or their equivalents are to be covered by the appended claims.

What is claimed is:

1. A color correction device, comprising:
    a light-emission information collection circuit configured to collect light-emission information of an external flash;
    a first communication circuit configured to communicate with a terminal device, so as to receive a color correction control instruction sent by the terminal device;
    a second communication circuit configured to send light-emission information of the external flash to the terminal device, wherein the terminal device is configured to process the light-emission information into sorting data of light-emission information; and
    a color correction processing circuit electrically connected to the light-emission information collection circuit and the first communication circuit, wherein the first communication circuit is further configured to receive the sorting data of the light-emission information and send the sorting data of the light-emission information to the color correction processing circuit, the color correction processing circuit receives the color correction control instruction transmitted by the first communication circuit and then performs color correction processing on the basis of the light-emission information to generate color correction result information, and the color correction result information is configured to be transmitted to the external flash so as to correct light-emission of the external flash.

2. The color correction device according to claim 1, wherein at least one of the first communication circuit and the second communication circuit is a wireless communication circuit; and
    wherein the wireless communication circuit comprises one or more of a WIFI module, a Bluetooth module, a Zig-Bee module, and an infrared communication module.

3. The color correction device according to claim 1, wherein at least one of the first communication circuit and/or the second communication circuit comprises a communication interface, wherein the communication interface is one or more of a USB interface, a TYPE C interface, an RS232 interface, and an RS485 interface.

4. The color correction device according to claim 1, wherein the color correction device further comprises a storage circuit, and the storage circuit is electrically connected to the light-emission information collection circuit, so as to store light-emission information of multiple detections; and
    wherein the storage circuit is electrically connected to the second communication circuit for sending the stored light-emission information to the terminal device through the second communication circuit.

5. The color correction device according to claim 1, wherein the light-emission information collection circuit further comprises a time sequence reception terminal, and the time sequence reception terminal is configured to connect with the terminal device to receive sequence control instruction sent by the terminal device; and
    wherein the light-emission information collection circuit collects light-emission information of the external flash according to the sequence control instruction.

6. The color correction device according to claim 1, wherein the color correction device further comprises a sequence control circuit, and the sequence control circuit is electrically connected to the terminal device, the external flash, and the light-emission information collection circuit; and
    wherein the sequence control circuit sends a sequence signal to the external flash and the light-emission information collection circuit according to the color correction control instruction, so that the external flash emits light at a preset sequence and the light-emission information collection circuit correspondingly collects the light-emission information at the preset sequence.

7. The color correction device according to claim 1, wherein the color correction device further comprises a third communication circuit, and the third communication circuit is configured to communicate with the external flash, so as to transmit the color correction result information to the external flash.

8. The color correction device according to claim 1, wherein the color correction device further comprises a programming circuit, and the programming circuit is electrically connected to the color correction processing circuit for electrical connection with the external flash, so as to program the color correction result information output by the color correction processing circuit onto a control chip of the external flash.

9. The color correction device according to claim 1, wherein the color correction device comprises a main body and a light pick-up portion protruding from one side of the main body, and the light-emission information collection circuit is located in the light pick-up portion.

10. The color correction device according to claim 9, wherein the main body is detachably connected to the light pick-up portion.

11. The color correction device according to claim 9, wherein the color correction device further comprises a human-computer interaction assembly, and the human-computer interaction assembly is provided on the main body; and wherein the human-computer interaction assembly is electrically connected to the light-emission information collection circuit and the color correction processing circuit, and the human-computer interaction assembly is used for one or more of receiving a color correction instruction, receiving a color correction setting parameter, and switching color correction modes.

12. The color correction device according to claim 11, wherein the human-computer interaction assembly comprises one or more of a key reception assembly, a voice input assembly, a touch input assembly, and a gesture control assembly.

13. The color correction device according to claim 9, wherein the color correction device further comprises a display screen, and the display screen is provided on the main body; and wherein the display screen is configured to display a color correction control interface, and displayed content of the color correction control interface comprises one or more of color correction start/stop information, color correction parameter setting information, and color correction mode switching information.

14. The color correction device according to claim 1, wherein the color correction device is a handheld device.

15. A color correction system comprising an external flash, a terminal device and a color correction device, wherein color correction device, comprises:

a light-emission information collection circuit configured to collect light-emission information of the external flash;

a first communication circuit configured to communicate with the terminal device, so as to receive a color correction control instruction sent by the terminal device; and a color correction processing circuit electrically connected to the light-emission information collection circuit and the first communication circuit, wherein the color correction processing circuit receives the color correction control instruction transmitted by the first communication circuit and then performs color correction processing on the basis of the light-emission information to generate the color correction result information, and the color correction result information is configured to be transmitted to the external flash so as to correct light-emission of the external flash;

wherein the color correction device is configured to detect the light-emission information of the external flash and processing the light-emission information under the control of the terminal device to generate the color correction result information, and wherein the external flash corrects the light-emission according to the color correction result information.

16. The color correction system according to claim 15, wherein the terminal device is one of a mobile phone, a tablet computer, a notebook computer, or a wearable device.

17. The color correction system according to claim 15, wherein the color correction device further comprises a second communication circuit, and the second communication circuit is configured to send the light-emission information of the external flash to the terminal device, wherein the terminal device is configured to process the light-emission information into sorting data of light-emission information; and wherein the first communication circuit is configured to receive the sorting data of the light-emission information and send the sorting data of the light-emission information to the color correction processing circuit.

18. The color correction system according to claim 17, wherein at least one of the first communication circuit and the second communication circuit is a wireless communication circuit; and wherein the wireless communication circuit comprises one or more of a WIFI module, a Bluetooth module, a Zig-Bee module, and an infrared communication module.

19. The color correction system according to claim 17, wherein at least one of the first communication circuit and/or the second communication circuit comprises a communication interface, wherein the communication interface is one or more of a USB interface, a TYPE C interface, an RS232 interface, and an RS485 interface.

* * * * *